E. PICKEN.
GRAIN SHOCKING DEVICE.
APPLICATION FILED APR. 11, 1911.

1,040,007.

Patented Oct. 1, 1912.
6 SHEETS—SHEET 3.

Witnesses
E. P. Ruppert
Wm. Bagger

Inventor
Edward Picken
By Victor J. Evans
Attorney

UNITED STATES PATENT OFFICE.

EDWARD PICKEN, OF WILLOW CITY, NORTH DAKOTA.

GRAIN-SHOCKING DEVICE.

1,040,007.      Specification of Letters Patent.      Patented Oct. 1, 1912.

Application filed April 11, 1911. Serial No. 620,337.

*To all whom it may concern:*

Be it known that I, EDWARD PICKEN, a citizen of the United States, residing at Willow City, in the county of Bottineau and State of North Dakota, have invented new and useful Improvements in Grain-Shocking Devices, of which the following is a specification.

This invention relates to grain shocking devices, and the principal object of the invention is to produce a simple and efficient shocking device which may be readily applied to and used in connection with all, or nearly all, the well known types of modern self binding harvesters in use at the present day and by the use of which the sheaves delivered from the binding mechanism will be set up into a compact shock which may then be deposited upon the ground without necessity for further handling until the grain is ready for gathering and stacking.

With this and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims, may be resorted to when desired.

In the drawings,
Fig. 3 is a side elevation showing the shocking device detached from the grain binder, the side shown being that which in practice is adjacent to the binder and which may be termed the inner side.
Fig. 6 is a bottom plan view.
Fig. 7 is a longitudinal vertical sectional view taken on the plane indicated by the line 7—7 in Fig. 5.
Fig. 8 is a transverse sectional view taken on the line 8—8 in Fig. 3.
Fig. 9 is a transverse sectional view taken on the line 9—9 of Fig. 3.
Fig. 10 is a transverse sectional view taken on the line 10—10 in Fig. 3.

Corresponding parts in the several figures are denoted by like characters of reference.

Figure 1:
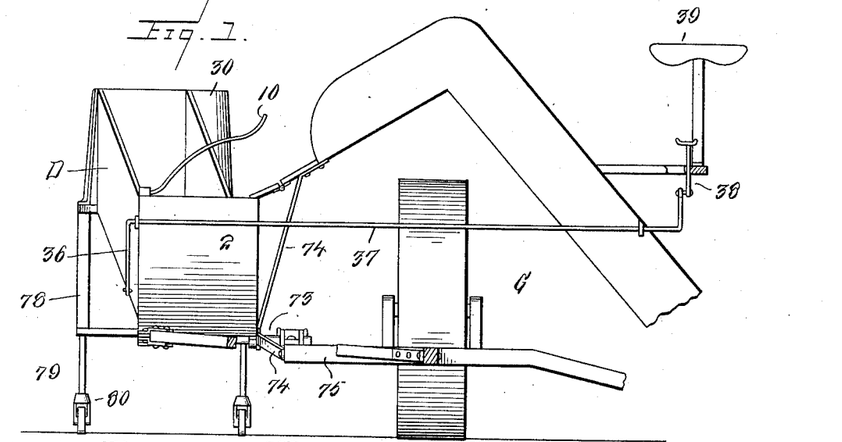
—Figure 1 is a diagrammatic front view showing the improved shocking device applied to a grain binder of which, however, only enough is shown to illustrate the connection.
Figure 2:
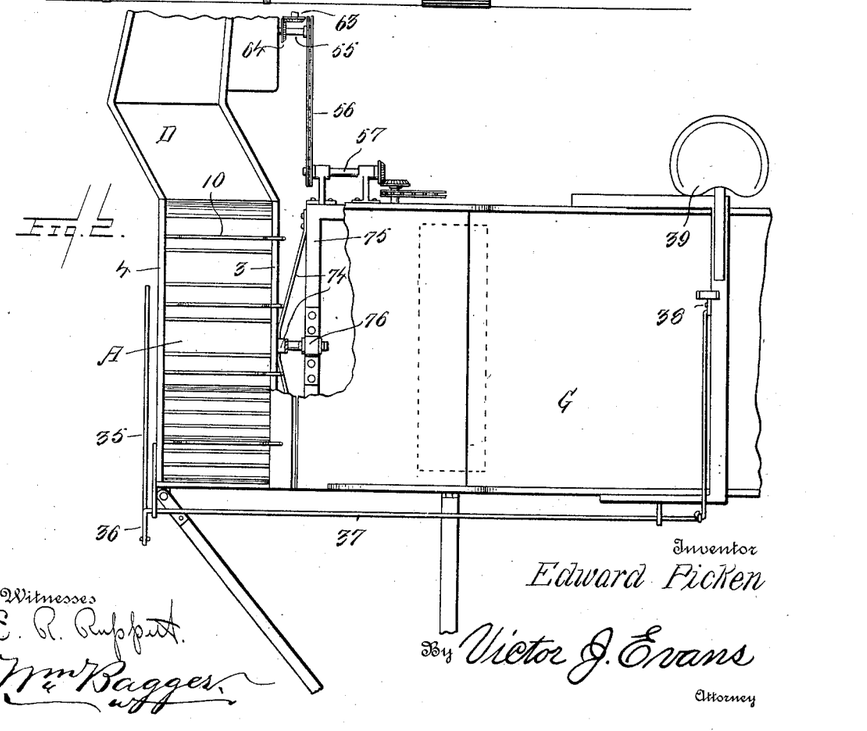
Fig. 2 is a diagrammatic top plan view of the parts shown in Fig. 1.
Figure 4:
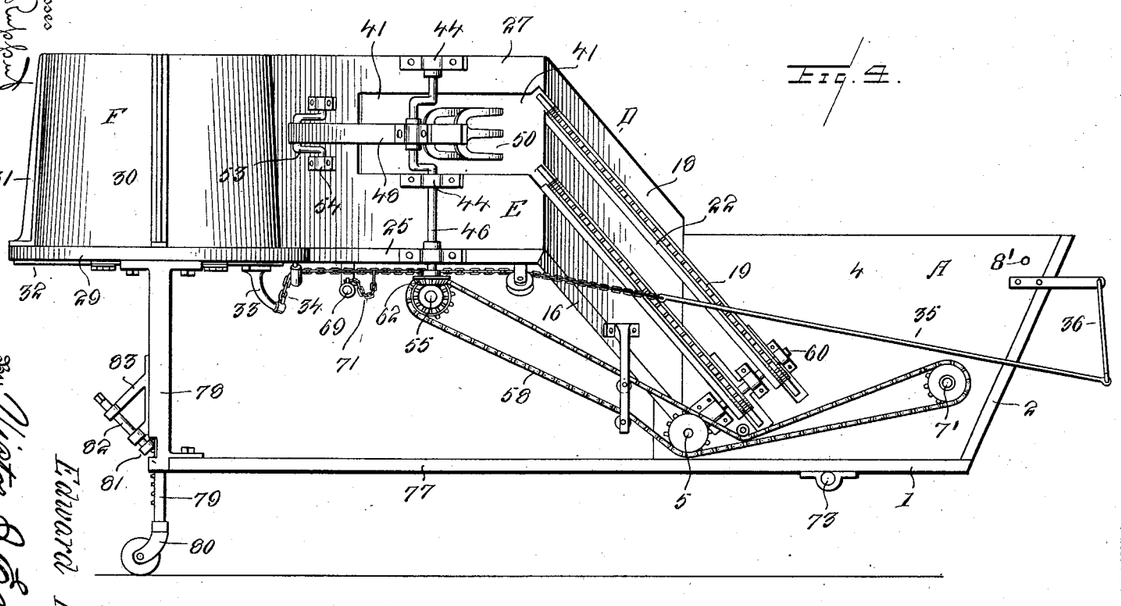
Fig. 4 is a side elevation illustrating the opposite or outer side.

The frame or casing of the improved shocking device includes a receiving compartment A having a flat bottom 1, an upwardly and forwardly inclined front member 2 and approximately vertical inner and outer side members 3, 4, the term "inner" being applied to that side member which in practice lies adjacent to the binder. Supported for rotation in the side members 3, 4 are the journals of a pair of rollers 5, 6, supporting an endless carrier B consisting of an apron 7 having slats 8 provided with teeth 9. An endless carrier C, the construction of which is similar to that of the carrier B, is supported upon a pair of rollers 7', 8', the journals of which are supported for rotation in the side members 3, 4, said carrier C being disposed in an inclined position adjacent to the inclined front member 2 of the receiving compartment. Suitably connected with the outer side member 4 of the receiving compartment at the upper edge of said side member are a plurality of guards or arms 10 consisting of resilient rods or wires which are suitably curved in an upward direction and which extend above and beyond the upper edge of the opposite wall of said member 3 in such a position that when the shocking device is applied to a grain binder in position for operation, as shown in Figs. 1 and 2, the sheaves on leaving the binder mechanism will be guided beneath the free upwardly curved ends of the arms or guides 10 and will drop into the receiving compartment, the butts of the sheaves being engaged by the rearwardly disposed lead of the carrier C which moves in a downward direction, as indicated by the arrow in Fig. 7. The operation of the carrier C tends, in connection with other devices to be presently described, to tilt the sheaf from the approximately horizontal position which it occupies at the time of its delivery from the binding mechanism to the shocking device, to an approximately vertical or upright position, with its butt end resting upon the carrier B, whereby it is moved in a rearward direction.

Mounted upon the inner face of each of the side walls or members 3 and 4 are supporting blocks 11, the opposed faces of which converge downwardly and rearwardly, said blocks serving to support guide members 12 between which bolts 13 are guided for vertical movement. Upon each of the side members 3 and 4, slightly in advance of the guide supporting blocks 11, is pivoted an arm 14 extending across the guide members 11 and having a slot 15 through which the bolt 13 extends, said bolt being provided with a clamp nut 15'. It will be seen that by loosening the nuts 15', the free ends of the arms 14 may be raised or lowered, the bolts or securing members 13 traveling between the approximately vertical guides 12 and in the slots 14 of the respective arms which, by retightening the nuts 15', may be firmly secured at the desired adjustment. The arms 14 are constructed of flat resilient material so that the free ends of said arms yield laterally to the passage of a sheaf of grain therebetween while the arms will be incapable of yielding vertically, said arms being thus useful to support the head of a bundle while such bundle is being upended by the means provided for this purpose. It will also be seen that by raising or lowering the free ends of the arms 14 with reference to the opposed faces of the blocks or guide members 11, the free ends of said arms will be at the same time moved to or from each other as the case may be. By such adjustment the arms 14 may be arranged in convenient position to operate in connection with grain bundles or sheaves of various dimensions, it being obvious that when the sheaves are quite small it is desirable that the arms 14 should be placed more closely together and vice versa. When a sheaf is dumped or discharged from the binder into the shocking device, the arms 14 will engage and interrupt the head of the sheaf which will thus be supported while the butt end is engaged by the carrier C to tilt the sheaf to an approximately vertical or upright position and by the carrier B whereby the sheaf is moved rearwardly between the resilient arms 14.

Figure 5:
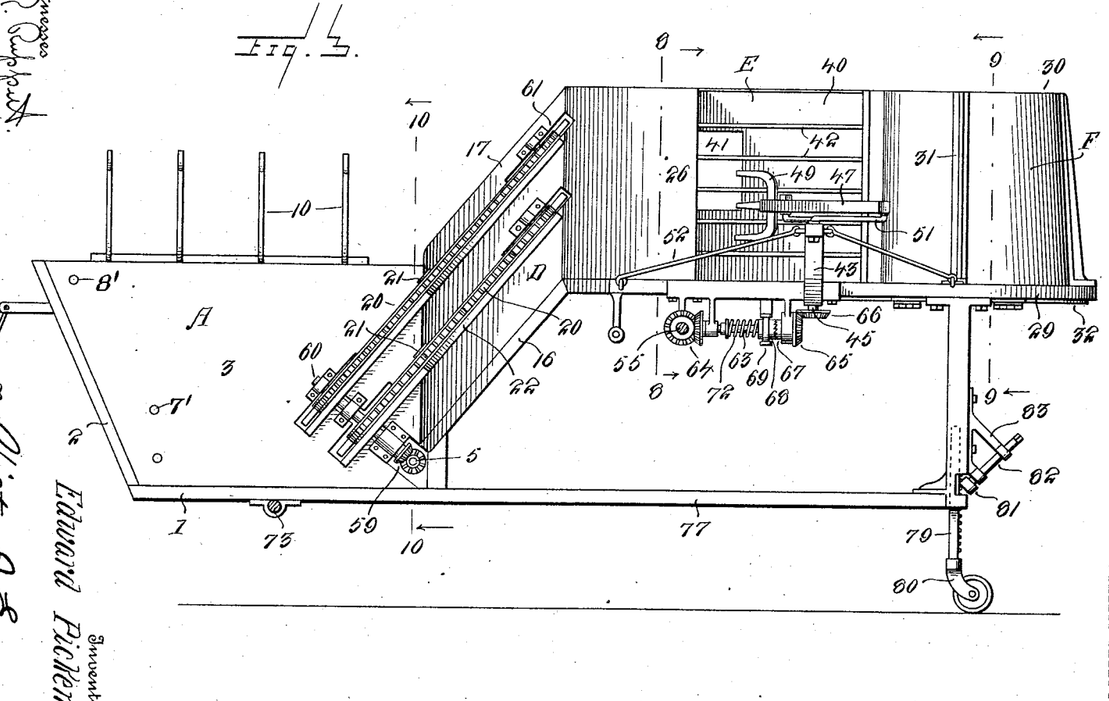
Fig. 5 is a top plan view.
Figures 5, 11:
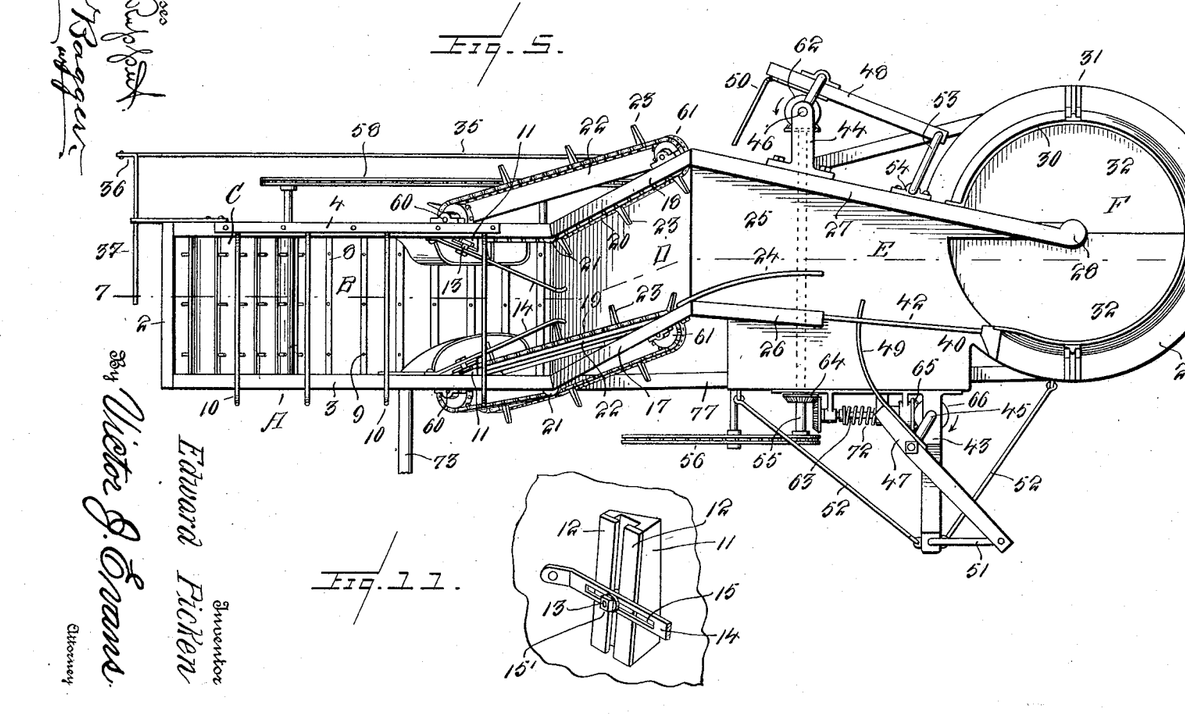
Fig. 11 is a perspective detail view of one of the supporting blocks used in connection with the supporting arms 14.
Figures 7, 8, 9:
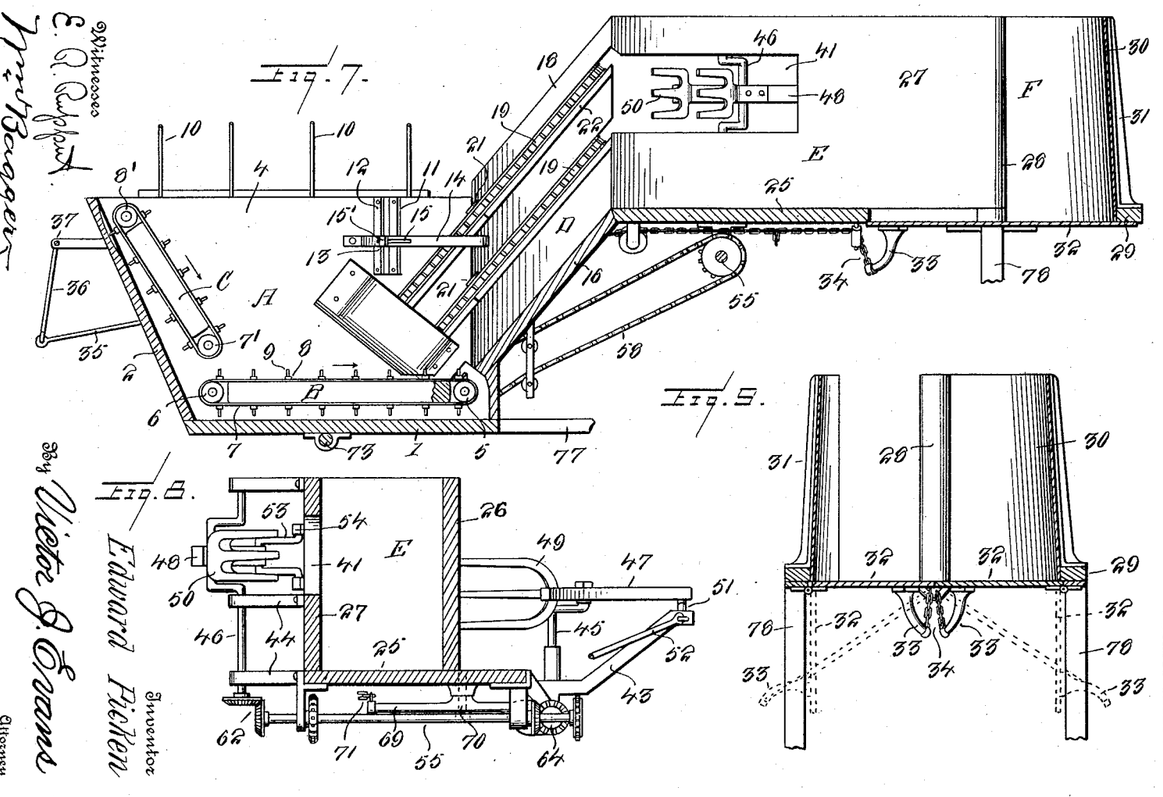
Figures 9, 10:
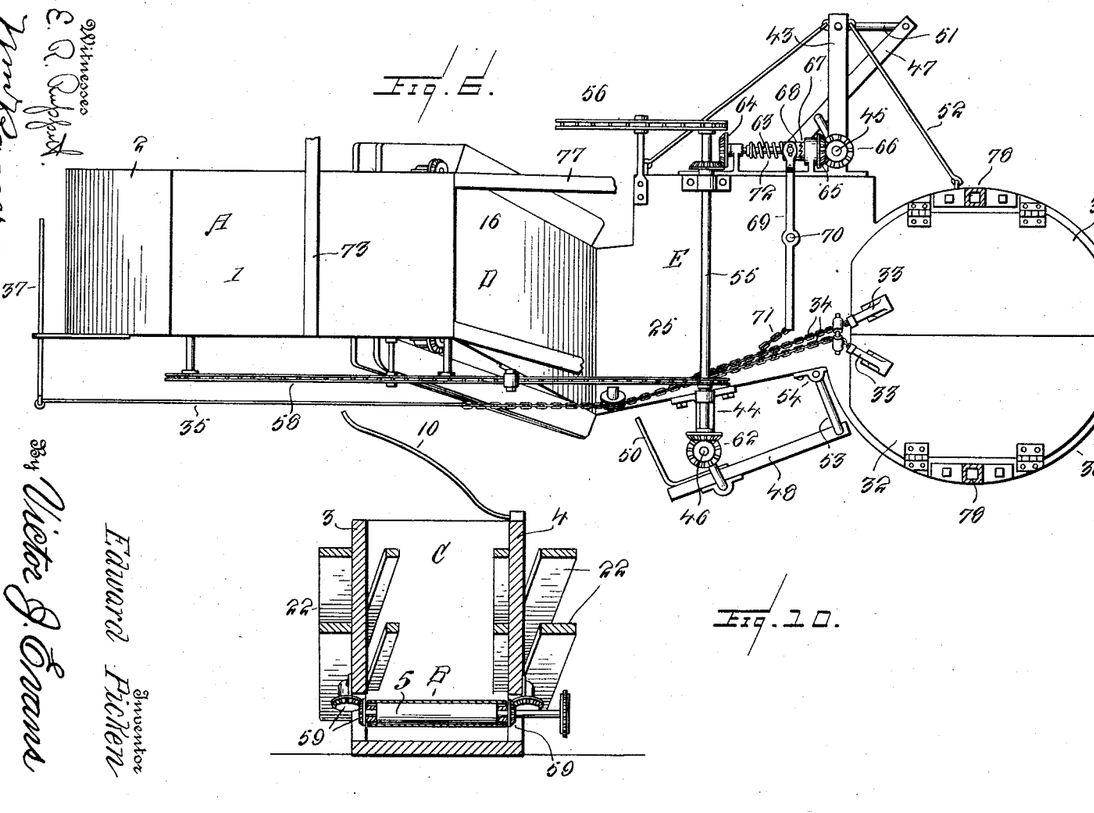

From the receiving compartment A an inclined and obliquely disposed passage D extends in an upward and outward direction, as will be clearly seen by reference to Figs. 7 and 5, respectively, said passage being composed of the inclined floor member 16 and the vertically disposed inner and outer side members 17, 18. The passage D connects the receiving compartment with the guideway E leading to the shock forming compartment F.

The inner and outer side members or walls 3, 17 and 4, 18 of the receiving compartment A and the passage D, respectively, are provided with slots for the passage of endless conveyer chains 19, 20 which are suitably guided over anti-friction pulleys 21 disposed at the angles formed by the intersections of the side members 3, 17 and 4, 18, respectively. The conveyer chains 19, 20 for which suitable guide means, such as braces 22, may be provided are equipped with arms 23 adapted to positively engage the sheaves of grain that are to be conveyed between the said chains from the receiving compartment to the guideway E. Secured upon the wall member 17 adjacent to the rear edge thereof are one or more resilient arms 24 that extend rearwardly into the guideway E for the purpose of engaging the sheaves that are introduced into the guideway to sustain such sheaves in an upright position and to prevent them from tilting. The guideway E consists of a throat or passage comprising the bottom member 25 and inner and outer side members 26 and 27 which converge rearwardly, as shown. The outer side member 27 carries at its rear end a post 28.

29 designates an arcuate base extending from the rear end of the inner side member 26 to the outer face of the side member 27 with which said arcuate base is connected, said base being concentric with the post 28, as will be clearly seen by reference to Fig. 5. This arcuate base serves to support the shock former 30 which latter consists of a casing constructed preferably of sheet metal and reinforced by external ribs or braces 31. The bottom of the shock former is composed of two members 32 which are hingedly connected with the underside of the base 29 and which are adapted to meet centrally beneath said base, said floor members being adapted to swing open for the purpose of permitting the shock of sheaves which has accumulated in the former to drop upon the ground, as will be readily understood. Each of the floor members 32 is provided with a downwardly extending bracket 33 which is connected by suitably guided flexible members 34 with an operating rod 35 which is guided adjacent to the outer side of the shock forming device and the forward end of which is connected with a crank 36 of a rock shaft 37 which is connected in any suitable and convenient manner with a foot lever 38, see Fig. 2, which is supported within convenient reach of the operator whose seat is indicated at 39. The operator, by placing his foot upon the lever 38, keeps the floor members 32 normally closed or in obstructing position. When it is desired to dump the contents of the shock former, the operator simply releases the pressure upon the lever 38, when the contents of the shock former will force the floor members to an open position, and said contents will then drop by gravity, after which the floor members may be restored to the normal obstructing position by foot pressure upon the lever 38.

The side walls 26 and 27 of the guideway

E are provided with apertures 40 and 41, see Figs. 3, 4, 7 and 8, and the aperture 40 in the wall member 26 which extends from the top to the bottom of said wall member is partly obstructed by longitudinal grate bars 42. Adjacent to the wall members 26, 27 are provided bearings 43, 44 in which crank shafts 45, 46 are supported for rotation, said crank shafts being approximately vertically disposed. Pivotally supported upon the cranks of the shafts 45, 46 are the handles 47, 48 of fork members 49, 50 which are adapted to operate through the apertures 40, 41 in the side walls 26, 27 of the guideway, the prongs of the fork member 49 being adapted to operate between the grate bars 42. A link 51 connects the outer end of the handle member 47 with the bracket member 43 which constitutes the bearing of the crank shaft 45 and which is reinforced by braces 52. A link 53 similarly connects the outer end of the handle member 48 with a box or bearing 54 upon the wall member 27. By this construction it will readily appear that when the crank shafts are rotated in a proper direction, each of the fork members will move orbitally in a forward, inward, rearward and outward direction with reference to the guideway E, the prongs or tines of the forks being thus projected into the guideway and moved rearwardly so as to assist in moving rearwardly in said guideway the sheaves which have been placed therein by the conveying means hereinbefore described. It will be readily seen that such sheaves will be forcibly moved in an upright or standing position rearwardly through the constructed throat or guideway and into the shock forming device or casing, where said sheaves will be guided about the axial post 28 and be packed as tightly as may be desired. The casing may be adapted to hold any desired number of sheaves, and the contents of said casing may be dumped at any time by the operator, as will be readily understood.

It will be observed that the fork member 50 is located in advance of the fork member 49 so that sheaves upon entering the guideway E will first be seized and operated upon by said fork member 50 and afterward by the fork member 49, by the action of which latter each sheaf will be successively pushed into the mouth of the shock forming casing.

For the purpose of actuating or transmitting motion to the various moving parts of the device there is provided a shaft 55 which is supported for rotation in suitable bearings transversely upon the underside of the bottom member 25 of the guideway E. Said shaft is adapted to receive motion transmitted by means of a chain or link belt 56 from a shaft 57 which is supported for rotation in suitable bearings upon the frame of the binder in connection with which the device is employed, said shaft 57 being constantly driven in any suitable manner by driving means associated with the binder. Motion is transmitted from the shaft 55 by means of a suitably guided chain or link belt 58 to the rollers 5 and 7' of the endless carriers B and C which are thus driven. From the roller 5 motion is transmitted by bevel gearing 59 to the shafts 60 that support the lower or front portions of the conveyer chains 19 and 20, the upper or rear portions of which are suitably guided upon elements 61 supported for rotation. The transverse driven shaft 55 transmits motion directly through bevel gearing 62 to the crank shaft 46. Supported for rotation in suitable bearings is a short longitudinal shaft 63 which is driven by means of bevel gearing 64 from the shaft 55. The shaft 63 carries a loose bevel gear 65 meshing with a bevel gear 66 upon the crank shaft 45, said bevel gear 65 being equipped with a clutch member 67 adapted to be engaged by a spring actuated clutch member 68 which is slidably mounted upon the shaft 63 for rotation therewith, as will be readily understood. The slidable clutch member 68 is actuated by a shipping lever 69 which is fulcrumed at 70 upon the underside of the bottom member 25 of the guideway E, said shipping lever being connected by a short flexible connection 71 with one of the flexible members 34 that are connected with the brackets 33 upon the obstructing members or floor members 32 of the shock former or casing. The arrangement is such that when the floor members 32 are held in obstructing position, the shipping lever will hold the slidable clutch member 68 in engagement with the clutch member 67, thus transmitting motion to the crank shaft 45. When the tension upon the clutch members is released for the purpose of dumping the contents of the shock former, the floor members 32 in swinging to an open position will exercise strain in a rearward direction upon the flexible members 34, thus actuating the shipping lever through the short flexible connection 71 to disengage the clutch members 67, 68, thereby suspending the operation of the crank shaft 45 and of the fork member actuated thereby. When the floor members 32 are restored to an obstructing position, the actuating spring 72 of the clutch member 68 will restore the latter, together with the shipping lever, to initial position. It will thus be seen that while the dumping operation takes place the rearward fork member 49 will remain stationary so that sheaves will not be fed into the shock former or casing, while the floor members thereof are in non-obstructing position, while the operation of the forward fork member 50 will continue without interruption to dispose of the sheaves as the latter are received from the binder.

Secured transversely beneath the floor member 1 of the receiving compartment A is a cross bar 73 from which brace members 74 extend in various directions to parts of the structure of the binder G, with the frame of which, 75, the cross bar 73 which is round in cross section may rock like a shaft. Frame members or sills 77, which extend rearwardly from the bottom of the receiving compartment, are connected at their rear ends with brackets 78 extending downwardly from the frame member 29, said brackets being provided with guides in which rack bars 79 carrying at their lower ends swiveled caster wheels 80 are vertically movable by means of worm gears 81 mounted upon inclined shafts 82 that are supported for rotation in suitable brackets 83, and which may be rotated by cranks or wrenches of any suitable description for the purpose of raising or lowering the shock forming portion of the device, according to the height of the grain that is being operated upon so as to avoid dropping the shock a greater distance than is absolutely necessary.

From the foregoing description, taken in connection with the drawings hereto annexed, the operation and advantages of this invention will be readily understood by those skilled in the art to which it appertains. Sheaves as they are delivered from the grain binder will be received in the receiving compartment where they are upended and from which they are carried in a standing position to the shock forming compartment from which, when a sufficient number of sheaves have been accumulated, the shock may be dropped upon the ground, thus saving the labor of handling the bundles, and also effecting a considerable saving of grain, a large portion of which is frequently lost from the ears by the usual manipulation of the bundles in forming the shocks.

Having thus described the invention, what is claimed as new, is:—

1. In a grain shocker, a receiving compartment having a downwardly and rearwardly inclined front wall, an endless carrier supported adjacent the said front wall to engage the butt ends of sheaves delivered into the compartment, an endless carrier supported adjacent to the bottom of the compartment to receive the butts of sheaves from the inclined conveyer, and rearwardly converging resilient arms supported upon the inner faces of the side walls of the compartment to support the heads of the sheaves while being upended by the action of the inclined conveyer.

2. In a grain shocker, a receiving compartment having side walls, rearwardly converging resilient members supported upon the side walls to engage the heads of sheaves delivered into the compartment, and an endless carrier supported in an inclined position to engage the butt ends of sheaves delivered into the compartment to upend the same.

3. In a grain shocker, a receiving compartment having side walls, rearwardly converging resilient members supported adjustably upon the inner faces of the side walls to engage the heads of sheaves delivered into the compartment, an endless carrier supported in an inclined position in the compartment to engage the butt ends of sheaves delivered therein, and an endless carrier supported adjacent to the bottom to convey the sheaves, standing, in a rearward direction.

4. In a grain shocker, a receiving compartment having side walls, slotted resilient members pivoted upon the inner faces of the side walls, downwardly and rearwardly converging guides, bolt members movable upon said guides and engaging the slots in the resilient members, and clamping nuts upon the bolts to secure the resilient members in adjusted position to engage the heads of sheaves delivered into the compartment.

5. In a grain shocker, a receiving compartment having side walls, resilient arms pivoted upon the inner faces of the side walls, blocks mounted on the inner faces of the side walls and having downwardly and rearwardly converging faces, and means for supporting the resilient arms adjustably with reference to the downwardly and rearwardly converging faces of the blocks.

6. In a grain shocker, a receiving compartment having side walls, rearwardly converging resilient members pivoted on the inner faces of the side walls, means for supporting the free ends of the resilient arms adjustably with reference to the side walls to vary the distance between the free ends of said arms and also to vary the distance between the arms and the bottom of the compartment, and means for upending sheaves the heads of which are supported on said arms and for carrying said sheaves standing in a rearward direction between said arms.

7. In a grain shocker, a receiving compartment having side walls, flat resilient arms pivoted on the inner faces of the side walls, said arms being capable of yielding laterally but not vertically, and means for adjustably supporting the free ends of said arms with reference to the side walls to vary the distance between said free ends and also to vary the distance between the free ends and the bottom of the compartment.

8. In a grain shocker, a guideway supported in an elevated position and having rearwardly converging side walls provided with apertures, a shock forming casing at the rear end of the guideway, means for delivering sheaves in a standing position into the front end of the guideway, crank shafts supported adjacent to the side walls, handles pivoted upon the crank shafts and having forks operating through the apertures in the side walls, links connecting the handles with relatively fixed parts of the structure, means for rotating the crank shafts to actuate the forks and means for interrupting the operation of one fork while the operation of the other fork is continued.

9. In a grain shocker, a guideway supported in an elevated position and having side walls provided with apertures, a shock forming casing at the rear end of the guideway hingedly supported bottom members for the shock former, means for delivering sheaves in a standing position into the front end of the guideway, forks supported for orbital movement near the front and rear ends of the guideway adjacent to the side walls and operating through the apertures therein to project the sheaves in a rearward direction, means for actuating the forks, means for supporting the bottom members of the shock former normally in obstructing position, and means for interrupting the operation of the rear fork when the bottom members move into discharging position.

10. In a grain shocker, a guideway supported in an elevated position and having side walls provided with apertures, a shock forming casing at the rear end of the guideway, hingedly supported floor members for said casing, means for actuating the floor members to move them to an obstructing position and to support them in such position, forks supported for orbital movement adjacent to the side walls and operating through the apertures therein, crank shafts supporting said forks, and means for driving said crank shafts including a driven shaft, bevel gearing connecting said shaft directly with one of the crank shafts, a counter shaft connected by bevel gearing with said driven shaft, a bevel gear upon the second crank shaft which is located in rear of the first mentioned crank shaft, a loose bevel gear upon the counter shaft meshing with the bevel gear upon the crank shaft, said loose bevel gear being provided with a clutch member, a spring actuated clutch slidable upon and connected for rotation with the counter shaft and adapted to engage the clutch member upon the bevel gear, a shipping lever for the clutch member, means connecting the shipping lever with the means for actuating the hingedly supported floor members of the shock forming casing, whereby when said floor members move to a non-obstructing position, the slidable clutch member will be thrown out of engagement with the clutch member of the gear wheel to thereby interrupt the motion of the crank shaft.

In testimony whereof I affix my signature in presence of two witnesses.

EDWARD PICKEN.

Witnesses:
PHILIP HALLS,
M. G. KIMM.

Copies of this patent may be obtained for five cents each, by addressing the "Commissioner of Patents, Washington, D. C."